(12) United States Patent
Suonvieri

(10) Patent No.: US 6,571,284 B1
(45) Date of Patent: May 27, 2003

(54) METHOD FOR REPEATER MANAGEMENT

(75) Inventor: Jukka Suonvieri, Tampere (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/331,764

(22) PCT Filed: Jan. 2, 1998

(86) PCT No.: PCT/FI98/00007

§ 371 (c)(1),
(2), (4) Date: Sep. 14, 1999

(87) PCT Pub. No.: WO98/29962

PCT Pub. Date: Jul. 9, 1998

(30) Foreign Application Priority Data

Jan. 3, 1997 (FI) ................................................. 970036

(51) Int. Cl.$^7$ ................................................. H04Q 7/00
(52) U.S. Cl. ........................... 709/221; 455/7; 370/246; 370/315
(58) Field of Search ........................... 709/221; 455/7, 455/9; 370/246, 252, 315

(56) References Cited

U.S. PATENT DOCUMENTS 5,077,828 A * 12/1991 Waldroup ..................... 455/34
5,301,353 A * 4/1994 Borras et al. .................. 455/9
5,323,384 A   6/1994 Norwood et al.

OTHER PUBLICATIONS

Patent Abstract of Japan, Publication No. 08289009 A, Jan. 11, 1996 Oyama Takahisa "Down–Loading Method for Operation Program in Private Branch Communication System".

* cited by examiner

Primary Examiner—Emanuel Todd Voeltz
(74) Attorney, Agent, or Firm—Pillsbury Winthrop LLP

(57) ABSTRACT

In order to integrate repeater management with network management in a wireless telecommunication network, a database is added to the network management center (NMC), said database including the data on the network repeaters (R1, R2, R3), which include for each repeater (R1, R2, R3) at least the identifier of the base station (BTS) corresponding to the repeater concerned; a repeater plan is made for changing repeater parameters to correspond to the changed configuration of the base stations; and each repeater is sent an update message (B1, B2, B3) containing parameters for the reconfiguring of the repeater (R1, R2, R3) to correspond to the repeater plan. The invention also relates to a network management system in which the method of the invention can be applied. In addition, the invention relates to a repeater, which can be utilized in the method and system of the invention.

9 Claims, 1 Drawing Sheet

1/1

METHOD FOR REPEATER MANAGEMENT

FIELD OF INVENTION

The invention relates to a method for repeater management in a telecommunication network utilizing wireless data transmission, said network comprising base stations for wireless transmission of data, repeaters for repeating the signals of the base stations to shadow regions, and a network management centre for changing the configuration of the base stations to correspond to a base station plan received by the network management centre.

The invention further relates to a network management system for a radio network, which comprises base stations for sending radio signals and repeaters for repeating base station signals to shadow regions, said network management system comprising a database for storing base station data and means for receiving a base station plan and for sending the information included therein to the base stations for changing their configuration.

The invention also relates to a repeater, which is part of a wireless data transmission network comprising a network management centre.

BACKGROUND OF INVENTION

Repeaters are used in data transmission networks utilizing wireless data transmission for covering base station shadow regions, e.g. in difficult terrain and in tunnels. A repeater is a transparent element on a radio path and its function is to amplify and repeat radio signals. Some of the repeater parameters are dependent on the parameters of that base station the shadow region of which the repeater covers and thus, when the configuration of the base station changes, these parameters need to be updated in all repeaters repeating its signals to make them correspond to the new parameters of the base station. This is particularly important in the case of channel selective repeaters, which only repeat certain frequencies. They have to be adjusted to repeat the same frequencies as the base station corresponding to them, because otherwise they will not function.

The person maintaining the network will have to configure the base stations, i.e. to change for instance the base station frequencies when extending or tuning the network and when increasing its capacity. The base stations are automatically updated to be in accordance with a new configuration by transferring a new base station plan to the network management, whereby the network management automatically loads the base station plan to the network by sending update messages to the base stations for their reconfiguration. In prior art solutions repeater parameters are reconfigured to correspond to the new base station plan by manually checking repeater by repeater, from the output list to be obtained from the network management, the new values, e.g. frequencies, of the base station corresponding to the repeater concerned. A problem with this method is that it is slow, susceptible to errors and laborious. In addition, the reliability of the network is poor because repeater updating is slow and susceptible to errors. Another problem with the known solutions is that if the repeaters malfunction, an alarm is not supplied to network management automatically. Also this reduces the reliability of the network. A further problem with the known solutions is that at present the user has to search for information with several different systems in order to find out the parameter values of the base station and the repeaters repeating its signals and what these values should be.

BRIEF DESCRIPTION OF INVENTION

An object of the invention is to integrate repeater management with network management in order to solve the above mentioned problems. This object is achieved with a method of the invention, which is characterized by adding to a network management centre a database including the data on the network repeaters, which include for each repeater at least the identifier of the base station corresponding to the repeater concerned; making a repeater plan for changing repeater parameters to correspond to the changed configuration of the base stations; and sending each repeater an update message containing parameters for the reconfiguring of said repeater to correspond to the repeater plan.

The invention further relates to a network management system, to which the method of the invention can be applied. The network management system of the invention is characterized in that the network management system comprises means for storing data on the repeaters in said database, which data contain for each repeater at least the identifier of the base station corresponding to the repeater concerned, means for utilizing the data on the repeaters stored in the database for producing a repeater plan in response to the received base station plan, and means for sending each repeater an update message corresponding to the repeater plan in response to the completion of the repeater plan.

The invention also relates to a repeater which can be utilized in the method and the network management system of the invention. The repeater of the invention is characterized in that the repeater comprises means for receiving update messages from the network management centre and means for changing its parameters in response to a message.

The invention is based on the idea of storing data on the repeaters in the database of the network management system, said data comprising, for each repeater, the identifier of the base station corresponding to the repeater concerned, a repeater identifier, a contact number and parameter values. These data are utilized e.g. when a new base station plan transferred to the network management system for further transmission to the base stations is used for changing the parameter values of the repeaters in the network management system to correspond to the base station plan, and for sending the repeater plan thus obtained to the repeaters in connection with the sending of the base station plan. This allows reconfiguring the repeaters substantially simultaneously with their respective base stations whereby e.g. the frequencies at the base stations and in the repeaters repeating their signals are the same. The most significant advantages of the invention are therefore increased network reliability and easier and faster updating of the repeaters because the slow and laborious work phase susceptible to errors is left out.

In addition, in a preferred embodiment of the invention, the repeaters acknowledge the changes they have made by returning their parameter values to the network management system. This provides the advantage that comparing the received acknowledgements with the planned values enables finding any repeaters the configuration of which for some reason was not successful, allowing the situation to be rapidly defined and corrected. Also, since the user can ask for parameter data from the repeater via the network management and use the data stored in the network management on base stations and repeaters, a further advantage provided by the invention is that the user obtains all data related to the network with one system.

In a preferred embodiment of the invention only the changed parameters are sent to the repeaters. This provides the advantage that the messages to be sent are short and the adjusting of the repeaters concerns only the changed values.

In a preferred embodiment of the invention the parameter values to be stored for the repeaters are collected from repeater-specific parameters of a fixed value and from the parameters of the base station plan. This provides the advantage of obtaining tailored parameters for the repeaters, which parameters take into account the location, i.e. the conditions of operation and the type of the repeaters, even if a rough level repeater planning programme is used.

Preferred embodiments according to the method and system of the invention are described in the attached dependent claims 2, 3 and 5–8.

BRIEF DESCRIPTION OF THE DRAWINGS

The invention is now described in more detail in connection with a preferred embodiment, with reference to the attached drawings in which.

DETAILED DESCRIPTION OF INVENTION

The invention is now described by way of example, thinking that the network management centre is a Network Management Centre NMC of the GSM system (Global System for Mobile Communications), which performs centralized management of the whole network. It enables for instance carrying out maintenance operations to base stations, such as frequency changes, by remote sessions. The network management centre comprises one or more Network Management Systems NMS, each one of which comprises four parts: Communication Part CP, Application Part AP, Data Part DP and User Interface UI. Communication part CP is responsible for maintaining the connections from operation and maintenance to network elements, such as base stations. Application part AP maintains the connections to the work stations of the user interface. It also comprises the operation and maintenance applications concerning fault, configuration and performance management. Data part DP contains a model of the network. In other words, parametrization and configuration data of elements conforming to the standards set for the GSM base station sub-system and network subsystem are stored in a centralized database. Data part DP collects and stores data arriving from application part AP or communication part CP. User interface UI comprises work stations through which the operator can manage the whole network. Through user interface UI the operator can for instance monitor the operation of the network, feed inquiries and data, e.g. a base station plan produced by a planning tool not belonging to the network management centre, to the network management system and receive data and reports.

Figure 1:
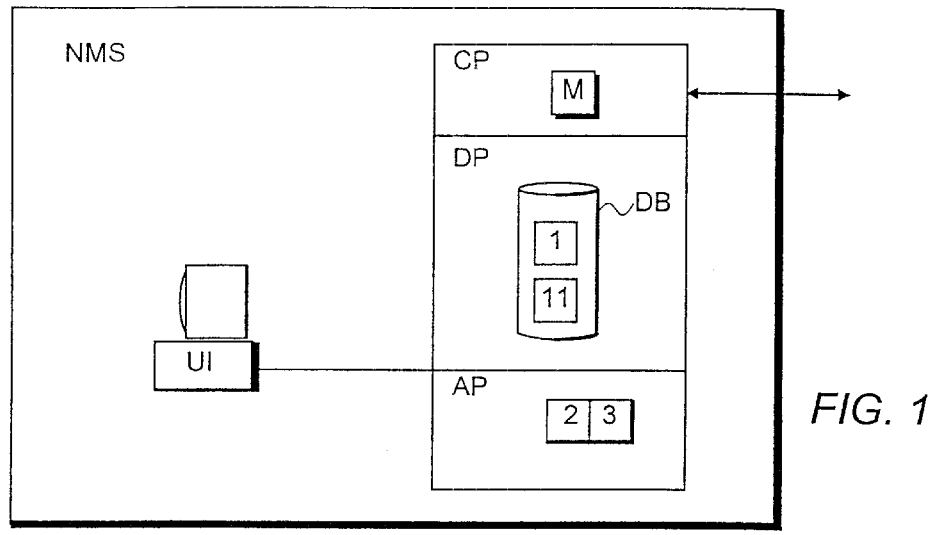
FIG. 1 is a block diagram illustrating a network management system according to a first preferred embodiment of the invention.

FIG. 1 is a block diagram showing a network management system according to a first preferred embodiment of the invention. The network management system NMS comprises the above mentioned parts. Although a user interface UI can comprise several work stations, for the sake of clarity only one is shown in the Figure. Database DB in data part DP also comprises data 1 on the network repeaters, said data 1 comprising at least the identifier of the repeater concerned and the identifier of the base station whose signals the repeater amplifies. With these data application part AP is able to set the same values for the frequencies of a repeater as the values of the base station corresponding to it. Data 1 on the repeater in database DB preferably also comprise the contact number of the repeater, the repeater frequencies set according to the base station and other parameter values the repeater needs, such as power. The repeater contact number is the number used for sending messages to the repeater. In database DB there can also be default value group 11 of the parameters of the repeaters for adding the data of a new repeater to the database, in case a planning tool for planning all the parameters needed by the repeater is not available. Default value group 11 does not, however, contain those repeater parameter values that are dependent on the base station parameter values, such as frequencies. Application part AP sets these values on the basis of the base station data stored in database DB. When adding repeater data 1 to database DB, application part AP selects from default value group 11 the antenna type of the repeater and, on the basis of its location, the parameter values for the repeater, which values can be manually fine adjusted, when necessary, via user interface UI. The criteria for selecting the parameters include e.g. "outdoor location, short mast" or "outdoor location, high mast, directional antenna" or "metro tunnel, radiative cable". Thus, for adding repeater data 1 to database DB, data part DP only needs the repeater identifier, the contact number, the base station identifier and the antenna type and the location of the repeater. If frequency values are the only parameter needed by the repeater, the antenna type and the location of the repeater are not needed for adding the repeater to the database. They are also not needed when such planning tools are used which enable obtaining all parameters for each repeater except those parameter values, such as frequencies, which are dependent on the parameters of the base station corresponding to the repeater concerned. Application part AP sets these values for the parameters. Data part DP stores data 1 on the repeaters in the database. Data 1 on the repeaters can be changed not only in response to a new base station plan, but also by feeding new data via user interface UI.

Application part AP in network management system NMS of the invention further comprises planning tools 3, which produce a repeater plan for the repeaters in response to a base station plan received by network management system NMS via a user interface. The repeater plan is produced utilizing data 1 on the repeaters, particularly the identifier of the base station corresponding to the repeaters, stored in database DB. The repeater plan is loaded into the network by sending each repeater an update message with communication part CP. The update message preferably only comprises the changed parameter values. It is therefore short and does not employ network resources unnecessarily. The update messages are routed to the repeaters on the basis of the contact number.

After the repeater plan is loaded into the network, communication part CP sends to the repeaters, one at a time, a message inquiring status data. If the messages inquiring status data were sent at the same time, modems M of communication part CP would no longer be able to receive the status data sent by all the repeaters at the same time and they would become congested. Messages inquiring status data can be sent e.g. alternately with update messages, if the update messages are not sent all at the same time. The received status data are further processed in reporting means 3 of application part AP for producing a confirmation report of the update of the repeaters and for transmitting it to the operator. The update confirmation report can e.g. include repeater specific information about whether the reconfiguration was successful. This information is obtained by comparing the values of the repeater parameters stored in database DB with the status data received from the repeater, this data showing the real values of said repeater parameters at a particular moment. Other ways of further processing status data can also be used.

In a network management system of the invention, reporting means 3 of application part AP can also produce a report showing, separately for each base station, the parameters of each base station and the parameters of the repeaters repeating the signals of a particular base station. This provides the advantage that if the parameter values of the repeater differ from the values of the base station, the repeater disturbing the operation of the network can be easily found. The parameters can preferably be reported in such a way that the planned value and the real value are given in the report so as to enable easy comparison between these values. The real parameters are obtained from the repeaters via the status data message. When the operator wishes, e.g. in case of a network malfunction, he can request a status report of e.g. one base station or one repeater via the network management centre. The network management system NMS automatically ensures that the parameter values are requested from both the base station and the repeaters repeating its signals or the repeater and the base station corresponding to it. In this case reporting means 3 are used to produce a report including only one base station with its parameters and the repeaters repeating its signals, with their parameters, or the repeater with its parameters and its respective base station with its parameters. This shows the real situation of the network and the reasons for any problems that may occur.

Communication part CP of the network management system is arranged to also receive fault reports from the repeaters, said reports comprising repeater status data of a repeater detecting an operational disturbance. Network management system NMS knows a report is a fault report when it receives a report although no status data inquiry has been sent. In this case reporting means 3 of application part AP produce an alarm report to the operator to user interface UI. This enables rapidly obtaining information about operational disturbances in the network and, at the same time, information identifying the cause of the disturbances and the base station in the area of which they occur.

The network management system can further comprise an operation and maintenance centre (not shown in the Figure), in which case some of the above mentioned means are possibly included therein.

Figure 2:
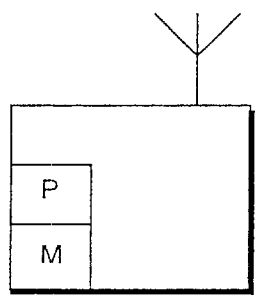
FIG. 2 is a block diagram illustrating a repeater according to the first preferred embodiment of the invention.

FIG. 2 is a block diagram illustrating a repeater of the invention. The invention can be applied to all types of repeaters, such as to a radiative cable and to masts equipped with different kinds of antennas. The repeater of the invention preferably comprises modem M, with which it can receive data messages from the network management system and, correspondingly, send a data message containing the values of its parameters to the network management system. The received data messages can contain update messages or a status data inquiry. Modem M can be connected to a fixed network, if one is available, or it can be in a mobile station, if the repeater has one. The mobile station can have a separate antenna of its own, through which it receives messages or the mobile station receives messages through the repeater. There are also other ways of connecting the repeater to the network management system. The repeater also comprises processing means P, which change the repeater parameters to correspond to the new values in response to an update message received from the network management system. The repeater further comprises monitoring means (not shown in the Figure), through which it monitors its operations. When the monitoring means detect a disturbance, they issue a command for sending a status data message, i.e. parameter values, to the network management system. The control means (not shown in the Figure) of the repeater's modem are preferably arranged to send the message containing the parameter values, i.e. the status data message, to the network management system only in response to a status data inquiry or to a command from the monitoring means.

Figure 3:
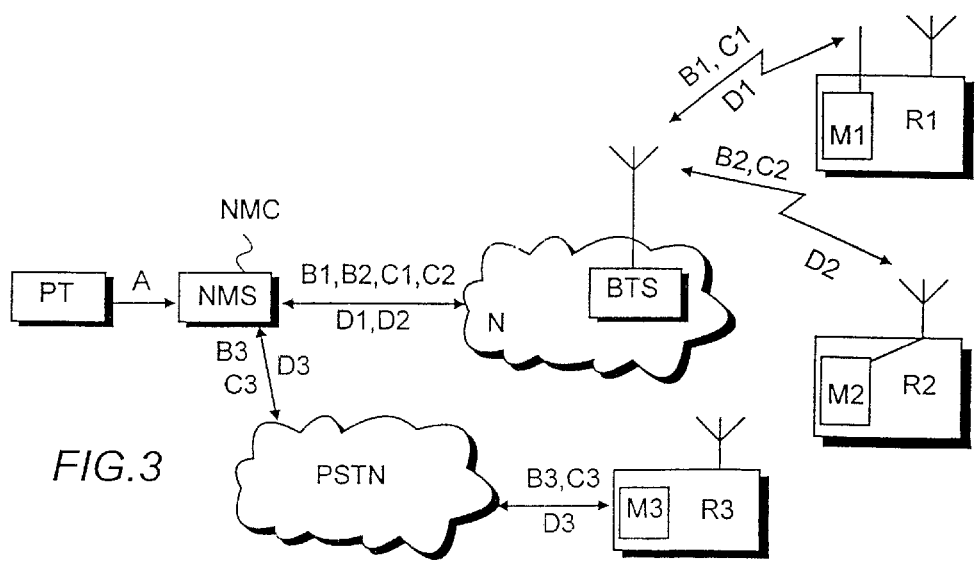
FIG. 3 illustrates the first preferred embodiment of the invention.

FIG. 3 illustrates the operation of the first preferred embodiment of the invention. Network management centre NMC comprises one or more network management systems NMS. For the sake of clarity the Figure shows only one network management system and only one base station BTS, the signals of which are repeated by three different repeaters R1, R2, R3. Unlike in FIG. 3, the repeaters can alternatively be of different type.

In FIG. 3 the network operator has drawn up a network plan of base stations, i.e. base station plan A, using planning tool PT available for this purpose. Plan A is transferred to network management system NMS where the reception of the plan initiates the drawing up of a repeater plan. It is made utilizing base station plan A and the data stored in the databases. Making of the repeater plan involves going through, repeater by repeater, the parameters corresponding to base station plan A of the base station corresponding to the repeater concerned, setting the parameters of the repeater to correspond to these parameters, storing the changes in the database and sending each repeater R1, R2, R3 a separate update message B1, B2, B3, which preferably only includes, in addition to the contact number, the changed parameter values of the repeater and an update command. Update message B1, B2, B3 can also comprise all the parameters and therefore the first update message sent to a new repeater to be connected to the network includes all its parameters. The data message containing update message B1, B2, B3 proceeds as a data call to repeater R1, R2, R3, either as a wireless data call via the wireless data communication network N used, such as a GSM network, or via a Public Switched Telephone Network (PSTN), if there is one close to the repeater and the repeater is connected to it.

By way of example it is assumed that the reception means for the update messages of repeaters R1, R2, R3 and the response means are connected to network management system NMS via modems M3 or mobile stations M1, M2. If repeater R3 comprises modem M3, which is coupled to the fixed network PSTN, or if repeater R1 comprises mobile station M1, which receives information from the base station via its antenna, then it does not matter in which order the update messages of the base station and the repeater are sent. Mobile station M1 listens to all frequencies via the antenna and so it also detects message B1 sent at a new frequency and is thus able to update repeater R1. Changes in base station frequencies do not affect the operation of the fixed network. If mobile station M2 of repeater R2 receives the information via repeater R2, repeater R2 is to be updated before base station BTS. Information about the reconfiguration of a repeater is obtained either by controlling whether the data call was successful or by sending message C2 inquiring the status data to the repeater. If no status data D2 is received from repeater R2, then repeater R2 is known to have updated its values with new ones and therefore it does not notice status data inquiry B2 sent at the old frequency. When the repeater is known to have updated its values, an update command will be sent to base station BTS.

The update messages of the base stations and the repeaters can be sent simultaneously from the network management system, the repeater update messages can be sent first or both methods are used together. In the latter case to those base stations which include a repeater to whose mobile station or modem the information is conveyed via said repeater, the update message is only sent when said repeater is updated, and to the other repeaters and base stations the update messages are sent simultaneously. This provides the advantage that the base station plan and the repeater plan can be quickly loaded into the network, but also repeaters to the telephone of which the radio signal passes via the repeater can be used and thus no separate antenna is needed for the telephone.

After network management system NMS has sent the update message to all base stations BTS and repeaters R1, R2, R3, it requests repeaters R1, R2, R3 one at a time for status data C1, C2, C3 as a data call, which the repeaters respond to with a data call giving their parameter values in their status data messages D1, D2, D3. This way blocking of the means receiving the status data of the network management system is avoided. Network management system NMS compares the parameter values included in each status data report D1, D2, D3 with the planned values and creates a confirmation report, which shows for each repeater separately how the updating has succeeded. If for any reason the data connection has not been obtained or the parameter values in the status report do not correspond to the planned values, network management system NMS tries to update these repeaters once again by sending an update message and a status data inquiry. Only then is the confirmation report complete.

It is to be understood that the above description and the related drawings are only meant to illustrate the present invention. For persons skilled in the art it will be apparent that the invention can be varied and modified in different ways without deviating from the scope and spirit of the invention described in the attached claims.

What is claimed is:

1. Method for repeater management in a telecommunication network utilizing wireless data transmission, said network comprising base stations for wireless transmission of data, repeaters for repeating and amplifying the wireless transmission from and to the base stations to shadow regions of the base stations, and a network management centre for changing the configuration of the base stations to correspond to a base station plan received by the network management centre, the method comprising:

adding to the network management centre a database including data on repeaters, which data include for each repeater at least an identifier of a base station the wireless transmission of which the repeater concerned repeats and amplifies, making a repeater plan for changing repeater parameters to correspond to the changed configuration of the base stations, and sending each repeater an update message containing parameters for the reconfiguring of said repeater to correspond to the repeater plan.

2. The method of claim 1, wherein only the changed parameters are sent in the update message to the repeaters.

3. The method of claim 1, further comprising:

adding a new repeater to said database by giving at least an identifier of the repeater, its contact number and the identifier of the base station, and storing in said database frequencies of the base station corresponding to the repeater concerned as the frequencies for said repeater.

4. Network management system for a radio network, which comprises base stations for sending radio signals and repeaters for repeating and amplifying radio signals to and from the base stations to shadow regions of the base stations, said network management system comprising a database for storing base station data and means for receiving a base station plan and for sending information included therein to the base stations for changing their configuration, means for storing data on the repeaters in said database, which data contain for each repeater at least an identifier of the base station the signals of which the repeater is arranged to repeat and amplify, means for utilizing the data on the repeaters stored in the database for producing a repeater plan in response to a base station plan received, and means for sending each repeater an update message responsive to the repeater plan.

5. The network management system of claim 4, comprising means for storing data on a new repeater in the database in response to a repeater identifier, contact number and base station identifier received by the network management system, and means for setting frequencies of each repeater in accordance with frequencies of the base station corresponding to the repeater concerned.

6. The network management system of claim 4, further comprising means for sending to the repeaters a message inquiring status data, means for receiving status data sent by the repeaters, which status data show values of the repeaters' parameters, and means for further processing information received from the repeaters for transmitting to an operator a report responsive to the information received.

7. The network management system of claim 4, further comprising means for producing a report, which report shows, separately for each base station, parameters of each base station and parameters of the repeaters repeating and amplifying its radio signals.

8. The network management system of claim 4, wherein the database comprises a default value group of parameters of the repeaters from which parameter default values corresponding to a repeater type and operational conditions are obtained for the repeaters.

9. A repeater of a wireless telecommunications network including a network management centre and at least a base station for wireless transmission of data, the repeater repeating and amplifying the wireless transmission from and to the base station in a shadow region of the base station and comprising:

means for receiving at least one update message from the network management centre, which update message indicates changed frequency parameters; and means for changing the repeater's frequency parameters as indicated in the update message.

* * * * *